May 12, 1964
M. J. BAUER
3,132,557
FRICTION TYPE DOWEL AND RING KEEPER THEREFOR
Filed Aug. 3, 1960
5 Sheets-Sheet 1
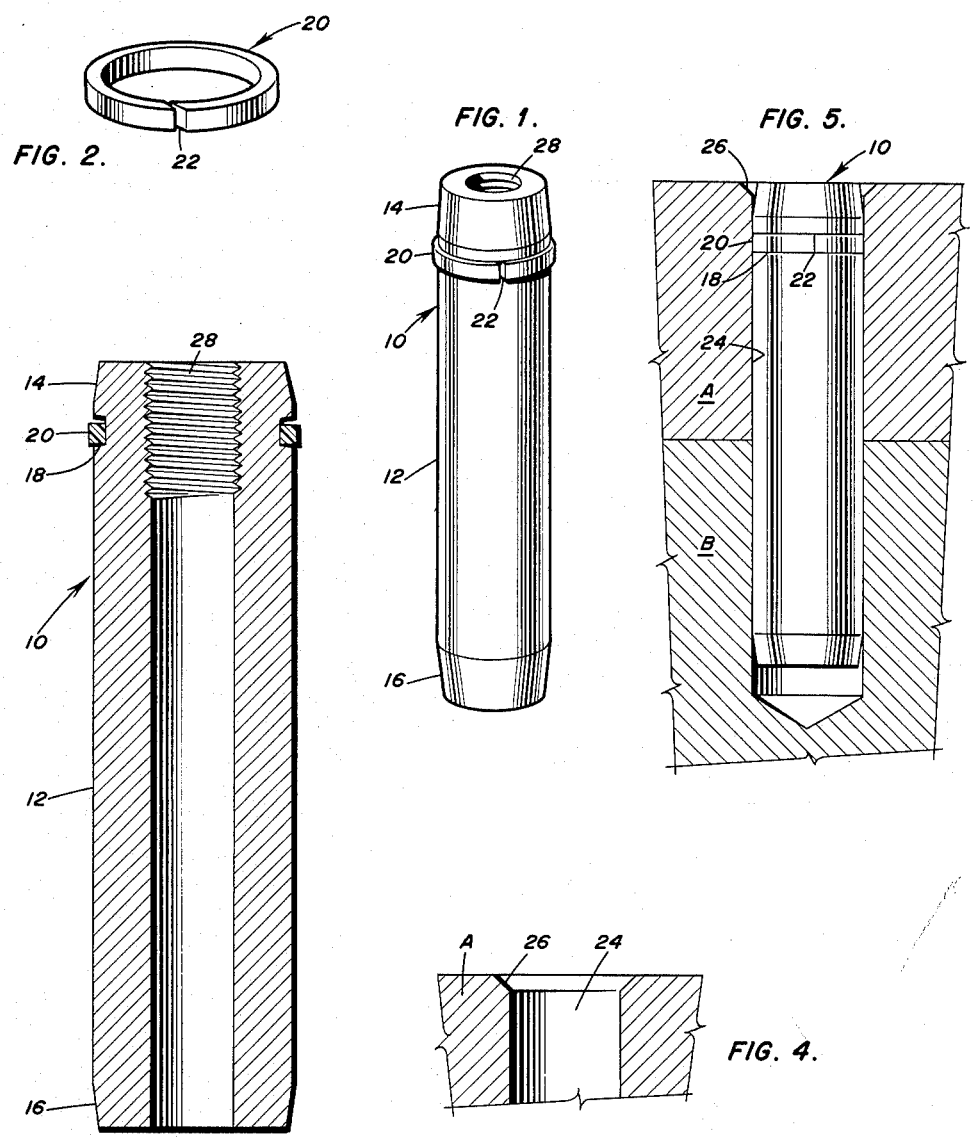
MYRON J. BAUER
INVENTOR
BY Walter G. Finch
ATTORNEY May 12, 1964

M. J. BAUER 3,132,557

FRICTION TYPE DOWEL AND RING KEEPER THEREFOR

Filed Aug. 3, 1960

INVENTOR
MYRON J. BAUER

BY Walter G. Finch
ATTORNEY

United States Patent Office 3,132,557
Patented May 12, 1964

3,132,557
FRICTION TYPE DOWEL AND RING
KEEPER THEREFOR
Myron J. Bauer, St. Paul, Minn., assignor to Northern Ordnance, Incorporated, Fridley, Minn., a corporation of Minnesota
Filed Aug. 3, 1960, Ser. No. 47,168
3 Claims. (Cl. 85—8.8)

This invention relates generally to fasteners and hardware locking devices, and more particularly it pertains to friction type dowels.

Dowels are widely used to accurately position several structural parts of a machine or structure together and other fasteners such as cap screws with more generous fit then are employed to accomplish the actual securement therebetween.

A taper pin is often used for the purpose but it requires an extra operation to taper the hole. Cylindrical type dowels are available with split walls or grooves to accommodate the clearance tolerance, and retain the pin in the hole under vibration conditions.

Where equipment must be disassembled occasionally, it is desirable that the dowel be reusable and when so reused to retain its dimensions and the dimensions of the hole as well as the holding qualities. This is not always the case with the existing types of dowels and pins mentioned.

It is, therefore, an object of this invention to provide a reusable friction type dowel which is easy to assemble and remove from its aperture and which retains its maximum strength.

Another object of this invention is to provide a dowel keeper for a dowel which has consistent friction and holding qualities under a wide range of vibration conditions.

Another object of this invention is to provide a dowel keeper which can be universally used for solid as well as blind hole types of dowels.

Still another object of this invention is to provide a friction type dowel having reproducible predetermined holding characteristics which can be economically produced in quantity.

And still another object of this invention is to provide a friction type of dowel keeper for a dowel which is feasible and practical, and which is efficient and reliable in operational use.

These and other objects and attendant advantages of this invention will become more readily apparent and understood from the following detailed specification and accompanying drawings in which:

FIG. 1 is a perspective view of a friction type dowel with a dowel keeper incorporating features of this invention;

FIG. 2 is an enlarged perspective view of the dowel keeper for a friction type dowel such as illustrated in FIG. 1;

FIG. 3 is an enlarged vertical section of the friction type dowel shown in FIG. 1;

FIG. 4 is a detail vertical cross-section view of a portion of a prepared aperture or hole for the friction type dowel such as illustrated in FIG. 1;

FIG. 5 is a view partly in elevation and partly in vertical section, illustrating the installation of the friction type dowel and its keeper in prepared aperture or hole;

Figure 7:
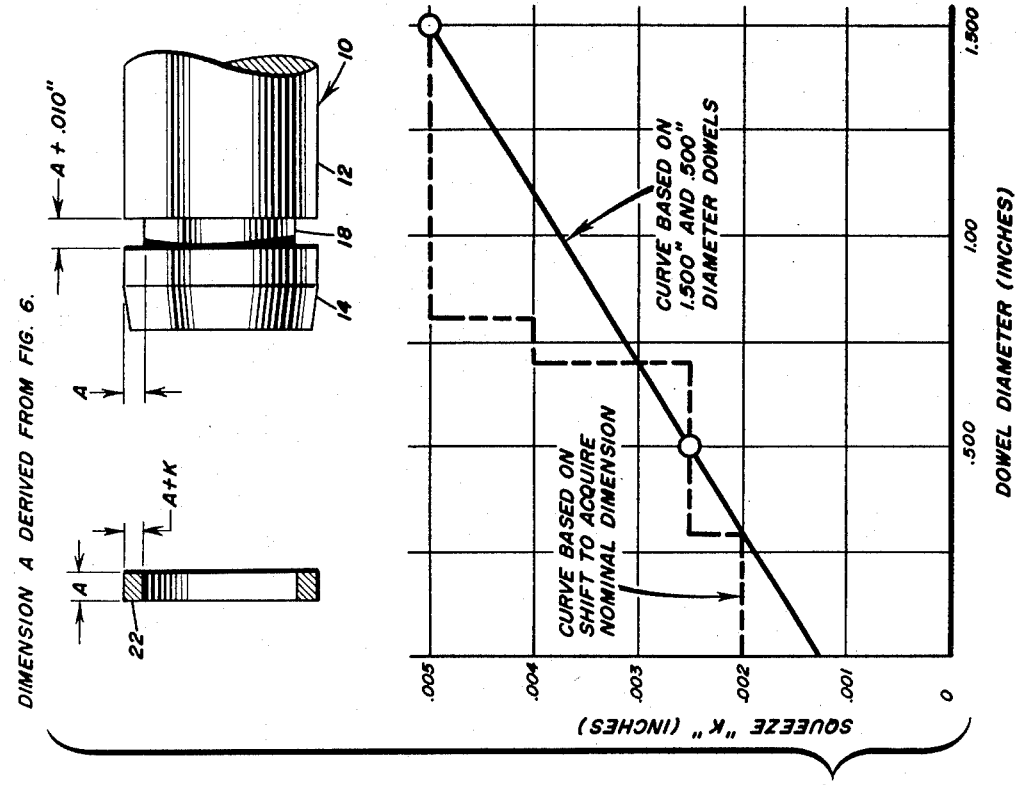
FIG. 7 shows a curve illustrating the squeeze "K" of the ring keeper as a function of the diameter of the dowel.

In accordance with the invention, a cylindrical shaped dowel having tapered ends is provided, together with a dowel keeper therefor. The dowel is provided with a peripheral groove at one end for receiving the dowel keeper, which consists of a split ring of nylon seated in the groove. The nylon ring is formed with a larger outside diameter than the dowel so that when it is forced into the dowel hole it exerts a friction drag.

Referring now to the details of the drawings, there is shown generally in FIGS. 1, 3, and 5 a new and improved dowel 10. The dowel 10 consists of an elongated straight cylindrical pin 12. This pin 12 is provided with slightly tapered ends 14 and 16.

Near one end 14 of the dowel 10, there is cut an annular groove 18 which receives a split ring keeper 20 of substantially rectangular cross section. The groove 18 is cut from eight to sixteen thousandths of an inch (.008" to .016") greater in width than the thickness of the ring keeper 20 and with slightly outwardly tapering sides of about five (5) minutes angularity each, as best shown in FIG. 3.

The ring keeper 20 is fabricated from a material having the combined qualities of friction drag, resilience, and viscous damping effect which are inherent to nylons. A preferred substance for example is nylon 101, or as an alternate nylon MIL–P–17091, Type I.

The inside diameter of the ring keeper 20 is made equal to the bottom diameter (inner diameter) of the groove 18. The outer diameter of ring keeper 20 is made from five to ten thousandths of an inch (.005" to .010") greater than that of its associated pin 12. Both dimensions are established before making a finite width cut 22 which splits the ring keeper 20 so that the keeper may be slipped over the end 14 of the dowel 10 and installed in groove 18.

As best illustrated in FIGS. 1 and 3, the ring keeper 20 overhangs or extends past the body diameter of the pin 12, and it rests snugly against the bottom diameter or inside diameter of groove 18. The ring keeper 20 has expansion space axially and peripherally but not radially.

As shown in FIGS. 4 and 5, a straight pin or dowel hole or aperture 24 is, as customary, bored in the structures A and B to be secured together for either of two fits for the diameter of pin 12. These fits are: push fit to light press fit for locating dowels, and medium press fit for load bearing dowels. However, it is important to break the receiving edge of the hole or aperture 24 with a chamfer 26 of about forty-five (45) degrees and of greater diameter than the relaxed ring keeper 20 so as to avoid shearing off the excess material thereof and rendering it useless.

When the dowel 10 is driven "home" in the hole or aperture 24 thus prepared as shown in FIGS. 4 and 5, the material of ring keeper 20 is forced to conform to diameter of the hole or aperture 24. The compression of ring keeper 20 is such as to peripherally close the finite gap or cut 22 and the remainder of the ring keeper 20 moves axially to fill the width of groove 18 including the tapered sides thereof.

Experience has shown and tests indicate that a very reproducible friction fit results from such compressive material distribution which prevents the withdrawal of the dowel 10 from the aperture or hole 24 except within a predictable range of applied force.

Where the aperture or hole 24 is blind as shown in FIG. 5, the customary tapped hole 23 is provided in the dowel 10 for a dowel puller of conventional design.

Figure 6:
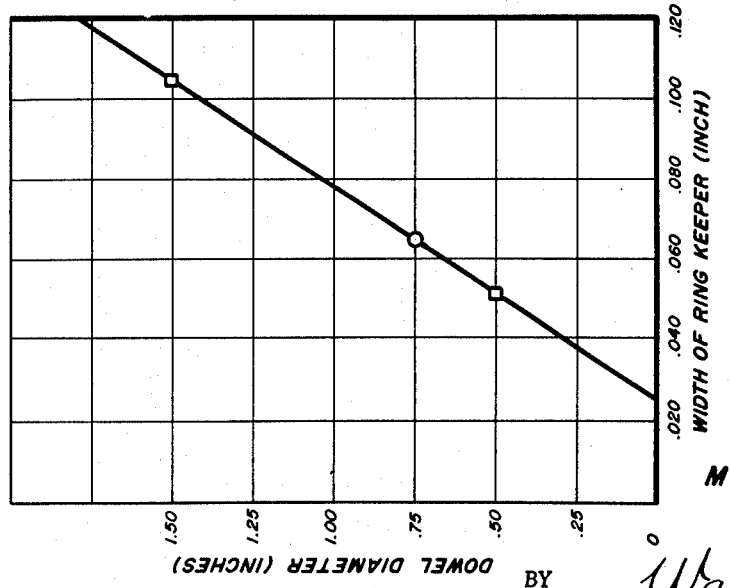
FIG. 6 shows a curve illustrating the diameter of the dowel as a function of the width of the ring keeper.

FIGS. 6 to 10 illustrate various test data for dowels 10 and ring keepers 20 having various dimensions and illustrating the characteristics thereof. For example, FIG. 6 illustrates the diaameter of the dowel 10 as a function of the width of the ring keeper 20.

FIG. 7 illustrates the squeeze of ring keepers 20 as a fuction of dowel diameter. As can be noted, the squeeze of the ring keeper 20 has been greatly reduced, which is caused by arriving at a bevel or chamber 26 on the hole entry edge which would be practical to put in with a common hand tool with no special care, tools or elaborate machining setup. It was found that a bevel cut on the hole entry edge with a hand scraper that was visible to the eye was sufficient to allow the keeper 20 to enter the hole 24 without shearing material from the keeper if the outside diameter of the keeper does not exceed the hole diameter by .010 inch.

Figure 8:
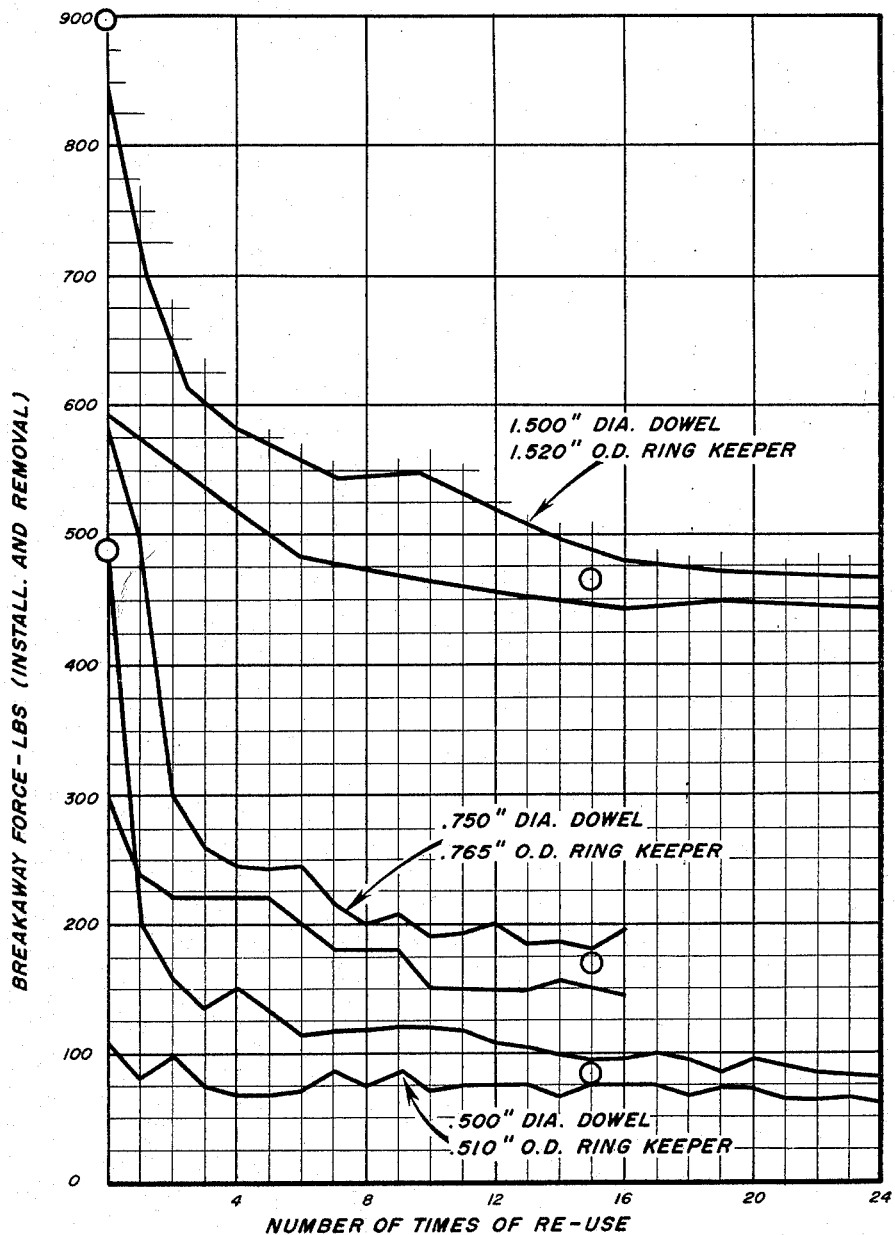
FIG. 8 illustrates a series of curves for dowels and ring keepers of various dimensions illustrating the breakaway force (dowel and ring keeper installed and removal thereof) as a function of the number of times of re-use of the dowel.
Figure 9:
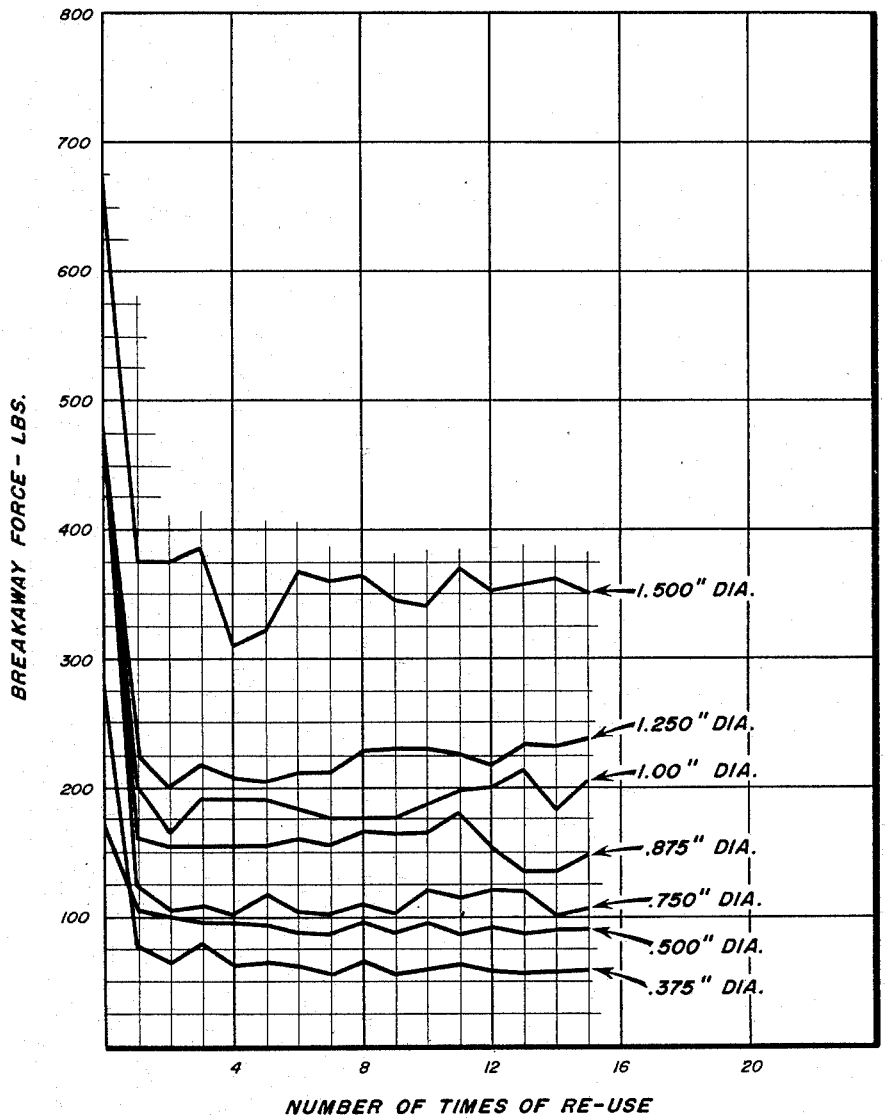
FIG. 9 illustrates a series of curves for dowels of various diameters illustrating the breakaway force as a function of number of times for re-use of dowel.
Figure 10:
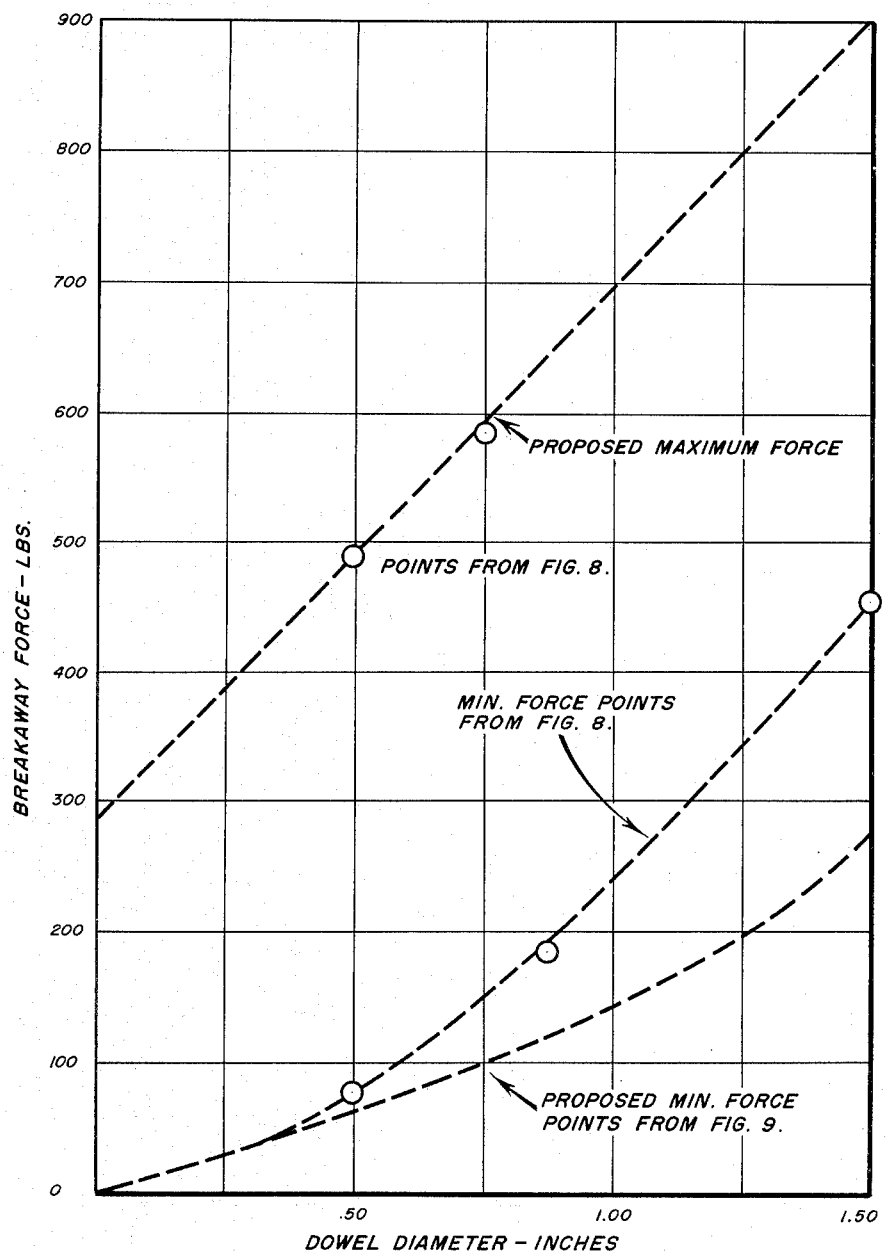
FIG. 10 illustrates a series of curves for minimum and maximum force points showing the breakway force as a function of dowel diameter.

FIG. 8 illustrates re-use data of the dowels 10 for dowel keepers 20 of various diameters, while FIG. 9 illustrates breakway force for the dowels 10 and keepers 20 as a function of number of times of reuse thereof. FIG. 10 illustrates breakway force of the dowel as a function of dowel diameter.

From the foregoing, it is to be noted that the dowel 10 and ring keeper 20 are practical and feasible, and can be used effectively and efficiently for holding structural parts together as previously described.

Obviously, many modifications and variations of the present invention are possible in light of the above teachings. It is therefore, to be understood that within the scope of the appended claims, the invention may be practiced otherwise than as specifically described.

What is claimed is:

1. In combination, a dowel having an annular groove in its peripheral surface intermediate its ends, and an annular resilient nylon split ring keeper with its ends spaced apart and being of rectangular cross section substantially contained within said groove and having one side thereof extending outwardly about 0.005–0.010 inch past the surface of said dowel, with the inner diameter of said split ring keeper being equal to the inner diameter of said groove, and with the width of the inner diameter portion of siad groove in said dowel being about 0.008–0.010 inch greater than the width of said ring keeper in the longitudinal direction of said dowel, the sides of said groove being inclined slightly outwardly from the inner diameter portion thereof, whereby when said dowel and ring keeper are inserted in a structure having an aperture whose cross section corresponds substantially to the cross section of said dowel, said ring keeper contracts peripherally and expands longitudinally in said groove to frictionally hold said dowel in said aperture of said structure.

2. In combination, a dowel having an annular groove in its peripheral surface intermediate its ends, and an annular resilient nylon split ring keeper with its ends spaced apart and being of rectangular cross section substantially contained within said groove and having one side thereof extending slightly past the surface of said dowel, with the inner diameter of said split ring keeper being equal to the inner diameter of said groove, and with the width of the inner diameter portion of said groove in said dowel being greater than the width of said ring keeper in the longitudinal direction of said dowel the sides of said groove being inclined slightly outwardly from the inner diameter portion thereof the width of said groove being such, whereby when said dowel and ring keeper are inserted in a structure having an aperture whose cross section corresponds substantially to the cross section of said dowel, said ring keeper contracts peripherally and expands longitudinally in said groove to substantially fill said groove including the outwardly inclined portions thereof to frictionally hold said dowel in said aperture of said structure.

3. In the combination of claim 2, wherein said dowel is provided with an internally threaded aperture at one end thereof for use in withdrawing said dowel from the aperture in said structure.

References Cited in the file of this patent

UNITED STATES PATENTS

| | | |
|---|---|---|
| 2,322,949 | Lux | June 29, 1943 |
| 2,456,355 | Aber | Dec. 14, 1948 |
| 2,584,873 | Hart | Feb. 5, 1952 |
| 2,847,238 | Bolling | Aug. 12, 1958 |
| 2,893,769 | Deliso | July 7, 1959 |
| 2,962,770 | Ingrahams | Dec. 6, 1960 |
| 2,962,923 | Stock | Dec. 6, 1960 |
| 2,968,375 | Avery | Jan. 17, 1961 |